United States Patent [19]

Harald et al.

[11] Patent Number: 4,843,873
[45] Date of Patent: Jul. 4, 1989

[54] METHOD AND APPARATUS FOR DETERMINING MOMENTS ACTING UPON AN OBJECT UNDER MEASUREMENT

[75] Inventors: Schneider Harald; Helmut Mayer, both of Augsburg; Hans W. Häfner, Aichach, all of Fed. Rep. of Germany

[73] Assignee: Pfister GmbH, Augsburg, Fed. Rep. of Germany

[21] Appl. No.: 190,848

[22] Filed: May 6, 1988

[30] Foreign Application Priority Data

May 8, 1987 [DE] Fed. Rep. of Germany ....... 3715460
Jan. 15, 1988 [DE] Fed. Rep. of Germany ....... 3801063
Mar. 10, 1988 [DE] Fed. Rep. of Germany ... 8803252[U]

[51] Int. Cl.$^4$ ............................................ G01M 9/00
[52] U.S. Cl. ................................... 73/147; 73/862.04
[58] Field of Search ...................... 73/147, 862.04, 669

[56] References Cited

U.S. PATENT DOCUMENTS

| | | | |
|---|---|---|---|
| 3,780,573 | 12/1973 | Reus | 73/146 |
| 4,073,188 | 2/1978 | Slezinger et al. | 73/147 |
| 4,522,074 | 6/1985 | Häfner | 73/147 |
| 4,662,217 | 5/1987 | Häfner | 73/862.04 |

Primary Examiner—Stewart J. Levy
Assistant Examiner—Lawrence G. Fess
Attorney, Agent, or Firm—Armstrong, Nikaido, Marmelstein, Kubovcik & Murray

[57] ABSTRACT

A method and an apparatus for determining at least one moment acting about a predetermined axis of an object placed on a force measuring apparatus in a flowing medium. In order to compensate measurement errors caused by a displacement of the center of gravity of the object upon application of the flowing medium exactly defined variable forces are applied to the object prior to the application of the flowing medium. The displacement of the center of gravity of the object is determined in dependence on the force variation and then taken into consideration when evaluating the force and moment measurements.

28 Claims, 2 Drawing Sheets

METHOD AND APPARATUS FOR DETERMINING MOMENTS ACTING UPON AN OBJECT UNDER MEASUREMENT

FIELD OF THE INVENTION

The invention relates to a method and an apparatus for determining moments acting upon an object under measurement and in particular to a method and an apparatus for use in a wind tunnel for determining aerodynamic properties of an object in an airflow.

BACKGROUND OF THE INVENTION

The U.S. Pat. No. 4,662,217 a method and an apparatus for determining tilting and rolling moments acting on a vehicle in a wind tunnel comprising four force-introduction plates each of which supports a wheel of the vehicle. Each force-introduction plate is associated with a respective guide member guiding a respective force-transmission member in a vertical direction, the guide members being connected together by a rigid frame. Each force-transmission member is connected to a respective force-introduction plate and acts on a respective force-measuring device. In a first object-related mode of operation, known as a 7-components configuration, the guide members are attached to the base, and the force-transmission members are moveable relative to the guide members. Wheel loads are measured and moments can be calculated using the distances between the wheels. In a second apparatus-related mode of operation, known as a 6-components configuration, the guide members are released from the base and attached to the force transmission members. Moments are obtained from force measurements and the distances between the force-transmission members. Hence the influences of a displacement of the force introduction points may be reduced; however, upon application of forces onto the vehicle, as by applying an airflow, a displacement of the car body in respect of the chassis comprising the motor and the wheels may occur, which displacement results in a displacement of the actual center of gravity in turn resulting in an error in of the readings of the measurement.

Specifically, wind tunnel apparatuses of the type defined above should have a desired accuracy of measurement in the order of 0.25 per mille. However, as indicated before, actual vehicles are displaced in an airflow due to the elasticity of the wheels and the suspensions thereof. Thus, with air velocities in the wind tunnel up to 200 km/h the displacement of the center of gravity of the vehicle in X-direction may be 2 cms.

Such a displacement of 2 cms and a vehicle mass of 1500 kgs would result in an aerodynamic moment about the axis MY of about 300 N.m with the permitted error of measurement of about 0.2 N.m.

Such an error must be expected both for the 6-component configuration and the 7-component configuration, the influence being smaller with the 7-components configuration since in the airflow the vehicle rolls on its tires to the rear which rolling effect at least partially compensates the error moment resulting from the displacement of the center of gravity of the vehicle.

When evaluating the readings of the measurements this error due to the displacement of the vehicle may be corrected by determining the displacement of the car body during measurement in X-direction and Y-direction and introducing these values in the evaluation (see DE-Z ATZ automobiltechnische Zeitschrift 87 (1985) No. 1, pages 31 to 36).

With such a method the displacement of the car body in the airflow is measured, but not the actual displacement of the center of gravity of the vehicle since the wheel suspensions, the motor, the gearing and the car body of the vehicle are displaced non-uniformly in relation the each other resulting in a relative displacement of the center of gravity of the vehicle with respect to the car body. With the known method the displacement of the center of gravity is assumed in a first approximation to be linear. However, such an estimate is very rough; thus, the required accuracy is not maintained.

According to another aspect of the invention the apparatus disclosed in the above mentioned DE-Z ATZ-automobiltechnische Zeitschrift 87(1985), No. 1, pages 31 to 36 uses four separate force-introduction plates for supporting the wheels of the vehicle. It is indicated that for determining the aerodynamic characteristics the measurement of the forces for the four individual wheels is necessary which determination is remarkably affected by the alignment of the wheels and the spring characteristics of the vehicle. Furthermore, errors arise which are directly dependent on the distances apart of the axles of the vehicle and of the wheels on each axle. The article comes to the conclusion that apparatuses using four individual force-introduction plates do not permit a meaningful error correction due to non-controllable tire deformations.

Such errors are caused by sinking and lifting forces acting on the vehicle on the street due to the airflow. Furthermore, in this situation the vehicle undergoes minor oscillations in vertical direction due to the spring system and the elastic suspensions. These vertical osciallations result in changes of the above mentioned distances apart of the wheels and the axles.

However, in a wind tunnel the wheels are fixedly adjusted on the individual force-introduction plates. Thus, the suspension of the chassis is unable to follow any oscillation in the manner as explained above to values of the distances apart in normal traffic. Therefore, there is a considerable difference between the results of measurement in a wind tunnel as compared with the actual situation in normal traffic.

SUMMARY OF THE INVENTION

It is an object of the present invention to provide a method and an apparatus for determining moments acting upon an object with increased accuracy.

It is a further object of the present invention to provide a method and an apparatus for measuring the tilting and rolling moments acting upon an object placed in wind tunnel.

It is a still further object of the present invention to provide a method and an apparatus for determining the tilting or rolling moment under consideration of any displacement of the center of gravity of a vehicle in an airflow.

It is a still further object of the present invention to provide an apparatus for determining the forces and moments acting on an object in an airflow in a wind tunnel with an improved simulation of real situations.

Accordingly the invention provides a method for determining at least one moment acting about a predetermined axis of an object placed on a force measuring apparatus in a flowing medium comprising the steps:

(a) applying to the object an exactly defined variable force in the intended direction of the flow of the flowing medium prior to the application of the flowing medium;

(b) varying said force applied to said object and determining a displacement of a centre of gravity of said object in dependence on said varying force;

(c) applying said flowing medium on said vehicle;

(d) measuring forces exerted onto said vehicle; and (f) evaluating said measurements in consideration of the displacement of the centre of gravity of said object.

According to another aspect of the invention there is provided an apparatus for determining at least one moment acting about a pre-determined axis on an object placed thereon in a flowing medium comprising:

(a) means for measuring a force component causing said moment, said means having a fpre-determined force introduction point for said force component said pre-determined force introduction point having a distance from said axis;

(b) means for determining said moment from said measured force component and said distance from said axis;

(c) means for applying exactly defined variable forces in a direction of a flowing direction of said flowing medium prior to an application of said flowing medium on said object;

(d) means for determining a displacement of a centre of gravity of said object in dependence on the application of said variable forces, and (e) means for evaluating said measurements in consideration of said displacements of said centre of gravity of said object upon application of said flowing medium.

According to a still further aspect of the invention there is provided an apparatus for determining at least one moment acting about a pre-determined axis on an vehicle provided with wheels, placed thereon in a flowing medium comprising:

(a) means for measuring a force component causing said moment, said means having a pre-determined force introduction point for said force component said pre-determined force introduction point having a distance from said axis;

(b) means for determining said moment from said measured force component and said distance from said axis;

(c) means for determining a displacement of said vehicle independence on the application of said flowing medium;

(d) means for evaluating said measurements in consideration of said displacements; and (e) force introduction plates onto which said vehicle is placed with said wheels; wherein at least one of said force introduction plates is arranged movably in at least one direction.

BRIEF DESCRIPTION OF THE DRAWINGS

Embodiments of the present invention will now be described by way, of example with reference to the accompaning drawings, in which:

FIG. 3 shows a measuring apparatus 100 provided with four separate force introduction plates 102 for supporting wheels 104 of a vehicle 103. The distance apart of the wheels 104 of each axle is designated by S which distance apart changes slightly according to arrow 105 upon spring oscillation caused by the airflow in the wind tunnel since the wheel suspensions including laterally and obliquely arranged levers 106 and springs 107 pivoted pivotes s about the suspension axes 108.

Figure 1:
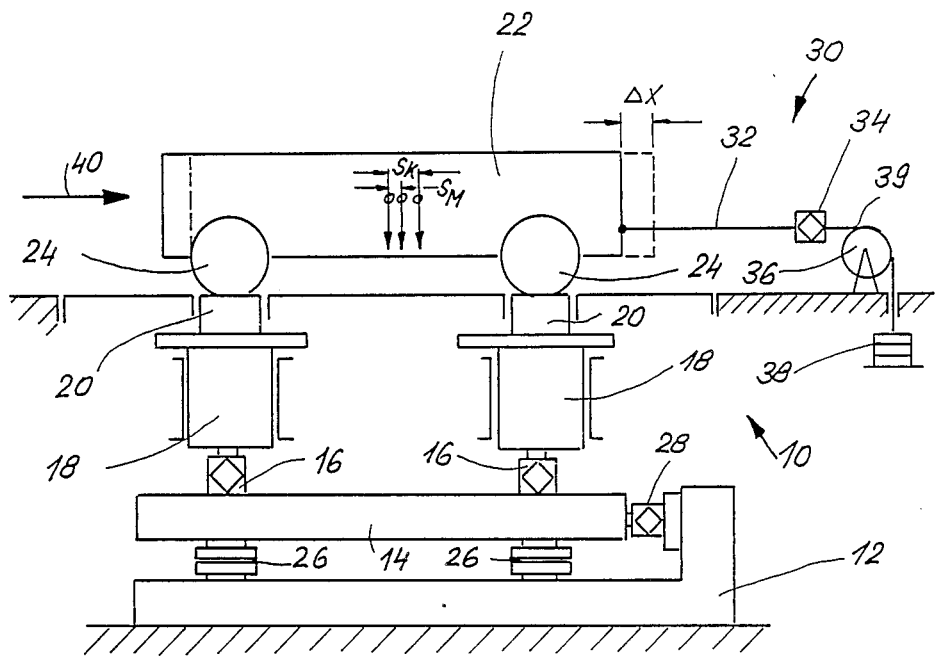
FIG. 1 is an elevational schematical view of a measuring apparatus for use in a wind tunnel in a 7-components configuration.

According to the invention the force introduction plates 102 may move in lateral direction: of the vehicle due to the provision of bearings, preferably roller bearings 109 upon changes of the distances apart due to the vertical oscillation of the vehicle suspension in the airflow. Thus, the wheels 104 and their tires, respectively, are not deformed upon changes in the distances apart, but are maintained free from tensions as in reality.

As well-known, for determining the aerodynamic characteristics of the vehicle the wheel loads are measured via force transmission elements, in particular vertically guided cylinders 110 by force measuring cells 111.

Figure 4:
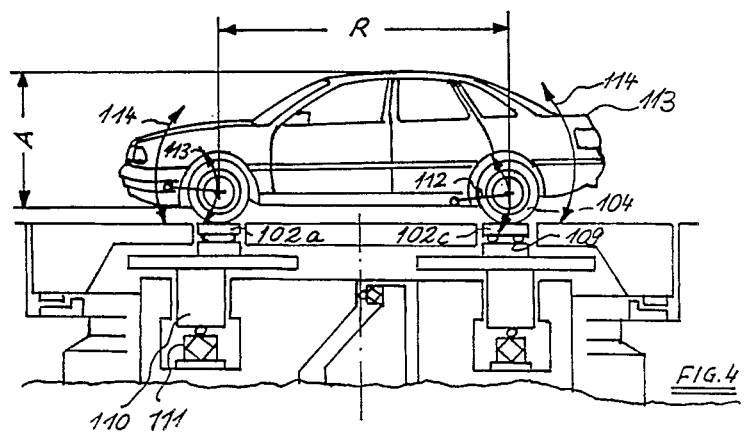
FIG. 4 is an elevational schematical view of the apparatus according to FIG. 3.

FIG. 4 shows the vehicle 103 and the upper part of the measuring apparatus 100 in an elevational view. FIG. 4 shows the force measuring cells 111, the force transmission cylinders 110 and the force introduction plates 102a, 102c as well as their bearings 109. The axles for the wheels 104 have a distance apart designated by R and the wheels 104 are shown suspended on longitudinal and oblique levers 112, respectively, and oscillate in accordance with the arrows 114.

Figure 3:
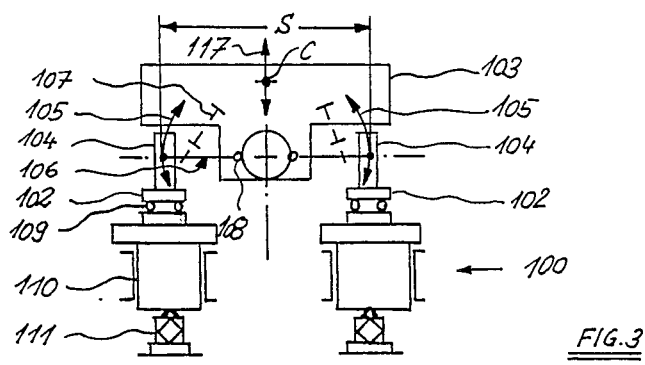
FIG. 3 is a schematic front view of an apparatus for measuring forces and moments acting on a vehicle in an airflow.

Directing an airflow to the vehicle 103 results, depending on the aerodynamic design, for example in a lowering of the front axle and a lifting of the rear axle. This means that the front wheels and the rear wheels move slightly laterally due to spring action in opposite directions. Therefore, as compared with the initial position without airflow the vehicle 103 will assume a slightly inclined position with a lower front end and a slightly lifted rear, as indicated by arrow 114. These changes in height are indicated in FIG. 3 with a vertical arrow 117 extending through the center of gravity C of the vehicle. Soecifically, such changes in height may cause the changes of the distance apart R of the wheel axles and of the vertical cross sectional area A which, in FIG. 4 is,,indicated in vertical direction only. Such changes may render incorrect the measured values by several percent.

Due to the bearings 109, indicated as roller bearings under the force plate 102c of the rear wheel 104 this wheel is shiftable in longitudinal direction according to the specific design of the vehicle and the changes in the distance apart R resulting therefrom. Thus, a real situation is closely simulated.

Figure 5:
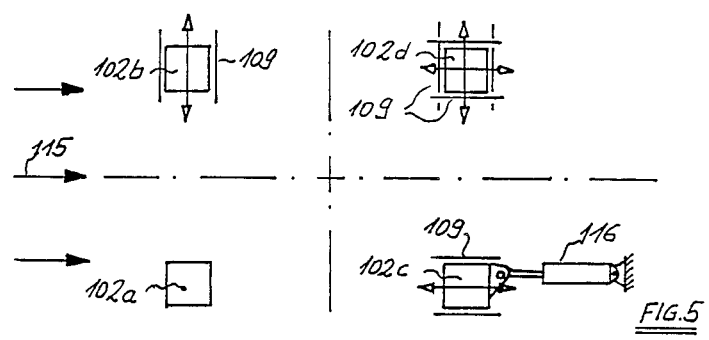
FIG. 5 is a schematic plan view of the force introduction plates of the apparatus according to FIG. 4.

FIG. 5 shows in a schematic plan view the free moveability of the four individual force introduction plates 102 on the bearings 109 permitting a compensation of changes in the distances apart of the axles and the wheels thereon upon application of an airflow in a wind direction 115 in very close simulation of reality. Specifically, the force introduction plate 102a of the left front wheel is fixed in longitudinal and lateral directions whilst the force introduction plate 102b for the right front wheel is laterally movable on its bearing 109.

DETAILED DESCRIPTION OF PREFERRED EMBODIMENTS:

FIG. 1 shows a schematic view of an apparatus 10 for use in a wind tunnel for determining aerodynamic properties of an object such as an vehicle in an air flow in a 7-components configuration. A horizontally extending plate 14 supports, preferably via hydrostatic bearings 26, on a fixed base 12 and acts in lateral directions, i.e. in a X-direction and a Y-direction onto one or several load cells 28 for measuring of horizontal forces exerted onto a vehicle 22.

The vehicle 22, which alternatively may be an airplane or another object to be tested in a wind tunnel, rests with its four wheels 24 on a force introduction member 20 each, which is supported by a force transmission member 18 for vertical movement in a preferably hydrostatic cylindrical bearing. Each force transmission member 18 in turn supports via a load cell 16 (measuring or weighing device) on the plate 14.

By means of the load cells 16 and 28, respectively, in a known manner the lift forces in Z-direction, and the horizontal forces in X-direction and Y-direction may be measured and the various moments, such as the tilting moment and the rolling moment, may be determined for a vehicle 22 in an airflow in direction of an arrow 40 in consideration of the distances apart of the wheels along each axle and the distances apart of the axles of the vehicle.

As mentioned before, the force in X-direction results in a displacement of the center of gravity of the vehicle designated with $S_M$ resulting in remarkable error moments. Furthermore, the FIGS. show a displacement $S_K$ of the car body.

Now, the invention provides a very simple method and apparatus for a complete and physically correct compensation of the displacement of the center of gravity.

The method of the invention features in the fact that prior to the actual measurement step, i.e. prior to the application of the air flow, an exactly defined vary force is a-plied to the vehicle in X-direction (and Y-direction). Depending on the force applied the vehicle is displaced by a certain amount. This displacement results in a change of the readings of measurement of the apparatus by the error moment of the displacement of the center of gravity.

In FIG. 1 the means for performing the method according to the invention is illustrated, in principle. In particular a cord or wire 32 is connected to the vehicle 22 which cord or wire 32 is loaded with variable forces via a load cell 34 in X-direction. In the drawing the forces are generated by weight 38 suspended on a further cord or wire 39 connected at its other end to the load cell 34.

Changing the weights 38 results in a different force exerted onto the vehicle 22 and measured by the load cell 34. In turn, this results in a corresponding displacement $\Delta X$.

The means 30 for determining the relation between the applied force and the displacement $S_M$ of the center of gravity is shown in principle only in FIG. 1. Quite different implementations are possible. For example, the weights 38 may be replaced by fixedly arranged mechanical, electro-mechanical or hyraulic pushing or pulling device applying a variable force via the road cell of force measuring element 34 to the vehicle 22.

The function or relation of the displacement of the center of gravity of the vehicle during applying a pulling force may be noted manually or preferably captured and stored in a data processing unit which in turn takes into account the correcting values in evaluating the readings of measurement.

Specifically, upon directing an airflow in the direction of the arrow 40 to the vehicle 22, in view of the force measured by the load cell 28 in X-direction the pre-determined displacement $S_M$ of the center of gravity of the vehicle is associated to this force and the moment generated thereby is used for a correction.

When applying the preparatory method according to the invention by loading the vehicle 22 with weights 38 in X-direction no vertical and lateral force components act onto the system. Specifically, the cord 32 should extend in exact horizontal longitudinal direction. Preferably, the pulling device 30 should be provided with a manual or automatic vertical and lateral adjusting means if the vehicle during pulling does not move only rearward and sideward, but also changes its height and central positions.

Figure 2:
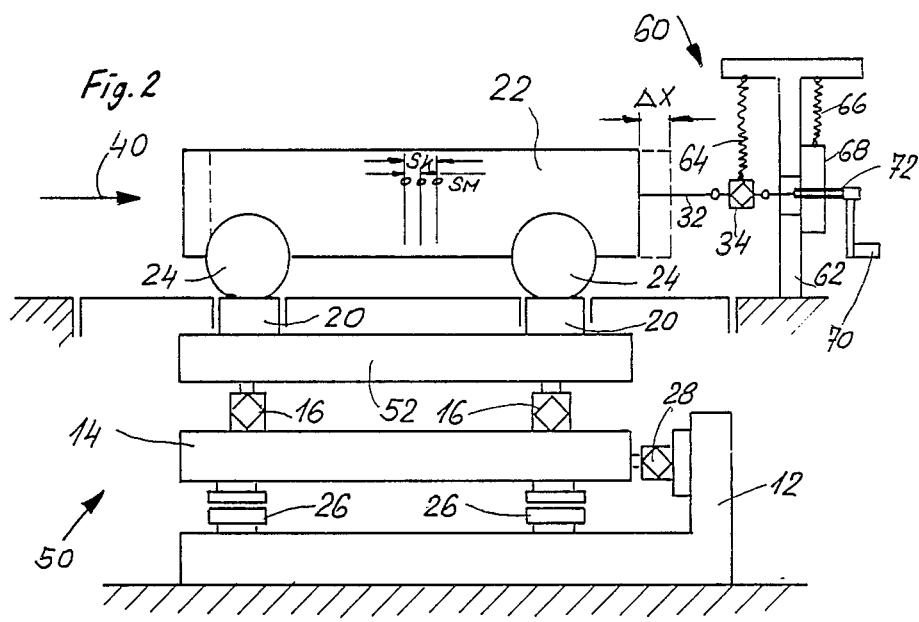
FIG. 2 is an elevational schematic view similar to that of FIG. 1 of a measuring apparatus for use in a wind tunnel in 6-components configuration.

FIG. 2 illustrates, in principle, such an adjusting means used in connection with an apparatus 50 in 6-components configuration.

As a modification as compared with the embodiment of FIG. between the force introduction members 20 and the load cells 16 a single force transmission member 52 formed as a transmission plate is provided as usual for a 6-components configuration.

A pulling device 60 of this embodiment permits an automatic vertical adjustment. Specifically, a support 62 has elements 64 and 66 attached thereto for unloading and automatic vertical adjustment of the cord 32 and the load cell 34. For example, element 64 can be a spring having the load cell 34 suspended thereon while element 66 can be a second spring which maintains a hydrostatic bearing 68 in a definite position for guiding cord or wire 72 in an exactly horizontal position while the tension cord is being tensioned by a spindle device 70.

The tension device 60 is used to determine the displacement of the center of gravity of the vehicle in dependence on the force applied to the cord of wire 32 and measured with load cell or force measuring device 34. Then, upon application of an airflow in the wind tunnel onto the vehicle 22 such a displacement is used for correcting the evaluation of the readinqs of the measurements of the load cells of force measuring devices 16 and 28.

With a further improvement of the method and the apparatus of the invention the load cell of force measuring element 34 may be omitted and the varying force exerted by the weights 32 or the tension wire 72 may be measured by the load cell of the force measuring device 28.

Furthermore, in order to take into account any fraction of the wheel suspensions or spring elements of the vehicle during measurement it is preferable to excite the vehicle or the tension device, when applying the method of the invention, i.e. when determining the curve of functional relationship (displacement of center of gravity in respect of varying forces). This may be done by vibrators, high frequency oscillations or other pulsations introduced mechanically, hydraulically or electrically. This corresponds to the situation when the vehicle is on the street or in the wind tunnel, where the vehicle (or another object) is automatically excited by the airflow during the measurement, which airflow reduces or prevents any frictions.

It should be noted, that devices for automatic vertical adjustment are well-known in connection with wind tunnel apparatuses. Thus, a detailed description thereof is omitted.

FIG. 3 shows a further embodiment of the invention incorporating further means for improving the accuracy of measurement of the aerodynamic characteristics of a vehicle. Specifically, FIGS. 3 and 4 show views of a force and moment measuring apparatus 100 in 7-components configuration for determining forces and moments acting on a vehicle 103 placed in an airflow in the direction indicated by arrow 115 in FIG. 5. The vehicle 103 is placed with its wheels 104 on force-introduction plates 102. The wheels 4 on each axle have a distance apart S slightly changing in the direction of the arrow 105 upon loading the vehicle 103 since the wheel suspensions including the lateral and oblique levers 106 and springs 107 pivot about their suspension axles !08.

According to the invention, the force introduction plates 102 are movable perpendicular to the longitudinal axis of the vehicle due to the provision of bearings 109 indicated as roll bearings. Consequently, the wheels 104 or their tires, respectively, will not be deformed by changes in the distance apart, but will kept free from any tensions as it is the case when the vehicle is moving on the street. The momentary loads acting onto the wheels will be transmitted from the force introduction plates through force transmission members 110, shown as vertically guided cylinders, to force measuring cells 111.

FIG. 4 shows the vehicle 103 and the upper part of the measuring apparatus 100 in an elevational view. Furthermore, the force measuring cells 111, the force transmission members 110 and the force introduction plates 102a and 102c including their bearings 109 are illustrated. The axles of the vehicle have a distance apart R and the wheels are suspended on longitudinal and oblique levers 112 for oscillation in the direction of arrows 113.

According to the aerodynamic design of the vehicle application of an airflow to the vehicle 103 will, for instance, result in a lowering of the front axle and a lifting of the rear axle. Accordingly, the front wheel suspensions will be pushed down whilst the rear wheel suspensions will be pulled upward. This means, that the vehicle 103 will slightly be moved downward in the front and upward at the rear according to the arrows 114. Therefore the vehicle 103 will assume a slightly tilted position as compared with the initial position without airflow. These changes in height are indicated in FIG. 3 by a vertical arrow through the centre of the vehicle 103 and may lead to changes in the distance apart R of the axles and of the cross sectional area A, in FIG. 4 just indicated in height direction, in the order of several percent as compared with the initial values.

Since the force introduction plate 102c of the rear wheel 104 has supports on roller bearings 109 the rear wheel 104 may be shifted in longitudinal direction depending on the forces acting onto the vehicle, the design of the vehicle and its wheel suspensions. Therefore, the vehicle will automatically assume a position as in reality, f.i. a slight inclination in front direction and a certain cross-sectional area A.

FIG. 5 shows a plan view onto the individual for force introduction plates 102a, b, c and d and their bearings 109 having different degrees of free movement. For example, the force introduction plate 102a for the left front wheel is fixed both in longitudinal and in lateral direction whilst the force introduction plate 102b for the right front wheel is laterally movable on its bearing 109. If upon application of the airflow the front axle is additionally loaded the distance apart S of the wheels (FIG. 3) will be slightly reduced resulting in a shifting of the force introduction plate 102 (b) of the right front wheel toward the interior of the vehicle.

For compensating changes in the distances apart of the axles of the vehicle the force introduction plates 102c and 102d of the rear axle are movable is longitudinal direction the force introduction plate 102d of the right rear wheel being, in addition, laterally movable as the force introduction plate 102b of the right front wheel in order to compensate changes in the distance apart of the rear wheels. Of course, wit? designs having a fixed distance apart of the wheels, as with designs using rigid axles, a lateral movability of the bearings may be omitted. The force introduction plates 102c and 102d of the rear axle are supported by bearings 109 for longitudinal movement for compensating any changes in the distance R between the two axles. Additionally, the force introduction plate 102d of the right rear wheel is laterally shiftable as the force introduction plate 102-b of the right front wheel, in order to compensate changes in the distance apart of the wheels on the rear axle. By the way, for axle design systems with absolutely constant distance apart of the wheels as for rigid axles no laterally shiftable bearings are necessary.

For example, if upon application of an airflow onto the vehicle 103 the front axle is loaded with a downward force resulting in a compression of the spring suspension system the distance apart S of the front wheels may be slightly reduced as compared with the initial situation of FIG. 3. Thus, the force introduction plate 102b of the right front wheel will be shifted slightly inward.

As mentioned in connection with the embodiments of FIGS. 1 and 2 according to FIG. 5 a vibrator 116, for example, an hydraulic pulsator as connected to the left rear force introduction plate 102c in order to simulate by introducing vibrations, for instance, according to the loading of the vehicle with lateral wind application frictional resistances of the chassis design may closely simulated to the operational situation on the street. This improves the accuracy of measurement

We claim:

1. A method for determining at least one moment acting about a predetermined axis of an object placed on a force measuring apparatus in a flowing medium comprising the steps:
    (a) applying to the object an exactly defined variable force in the intended direction of the flow of the flowing medium prior to the application of the flowing medium;
    (b) varying said force applied to said object and determining a displacement of a center of gravity of said object in dependence on said varying force;
    (c) applying said flowing medium on said object;
    (d) measuring forces exerted onto said object; and
    (e) evaluating the force measurements to correct for the displacement of the center of gravity of said object.

2. The method of claim 1 wherein step (b) comprises varying said variable force by changing standard weights connected to said object by a flexible connecting means for action in the direction of the intended flow of said flowing medium.

3. The method of claim 2 wherein step (b) includes adjusting said applying of said variable force with respect to height and direction in relation to said object.

4. The method of claim 2 wherein step (b) further comprises applying vibrations onto said object.

5. The method of claim 1 wherein step (b) comprises a variable tension means connected to said object for action in the direction of the intended airflow.

6. The method of claim 5 wherein step (b) further comprises measuring the momentary force acted onto said object by said tension means.

7. The method of claim 6 wherein step (b) includes adjusting said applying of said variable force with respect to height and direction in relation to said object.

8. The method of claim 5 wherein step (b) includes adjusting said applying of said variable force with respect to height and direction in relation to said object.

9. The method of claim 5 wherein step (b) further comprises applying vibrations onto said tension means.

10. The method of claim 1 wherein step (b) includes adjusting said applying of said variable force with respect to height and direction in relation to said object.

11. The method of claim 1 wherein said object is a vehicle provided with wheels and placed with said wheels on force introduction plates of said force measuring apparatus, and wherein at least one of said force introduction plate is arranged movably in at least one direction.

12. The method of claim 11 wherein at least one of said force introduction plates is kept fixed.

13. The method of claim 11 wherein at least one of said force introduction plates is kept fixed and at least one of said force introduction plates is movable both in said direction of said intended flow of said flowing medium and perpendicular thereto.

14. An apparatus for determining at least one moment acting about a pre-determined axis on an object placed thereon in a flowing medium comprising:
(a) means for measuring a force component causing said moment, said means having a pre-determined force introduction point for said force component said pre-determined force introduction point having a distance from said axis;
(b) means for determining said moment from said measured force component and said distance from said axis;
(c) means for applying exactly defined variable forces in a direction of a flowing direction of said flowing medium prior to an application of said flowing medium on said object;
(d) means for determining a displacement of a center of gravity of said object in dependence on the application of said variable forces; and
(e) means for evaluating the force measurement to correct for said displacement of said center of gravity of said object upon application of said flowing medium.

15. The apparatus of claim 14 wherein said means for applying said variable forces is a force producing means connected to said object via a force measuring device.

16. The apparatus of claim 14 wherein said means for applying variable forces are exchangable standard weights connected to said object by a flexible connecting means extending exactly in the direction of said intended flow of said flowing medium.

17. The apparatus of claim 16 wherein said means for applying said variable forces is an adjustable force producing means connected to said object.

18. The apparatus of claim 16 wherein said force producing means are connected to said object such that said variable forces are applied exactly in said direction said flowing medium despite changes in a position of said object.

19. The apparatus of claim 14 further comprising means for adjusting said force application means with respect to height and direction in relation to said object.

20. The apparatus of claim 14 wherein said object is a vehicle provided with wheels, said apparatus further comprising force introduction plates for placing said vehicle with said wheels thereon, wherein at least one of said force introduction plates is arranged moveably in at least one direction.

21. The apparatus of claim 20 wherein at least one of said force introduction plates is kept fixed.

22. The apparatus of claim 20 wherein at least one of said force introduction plates is kept fixed and at least one of said force introduction plates is movable both in said direction of said intended flow of said flowing medium and perpendicular thereto.

23. The apparatus of claim 22, wherein one of said force introduction plates is kept fixed wherein another of said force introduction plates is movable both in said direction of said intended flow of said flowing medium and perpendicular thereto, and wherein yet another of said force introduction plates is movable substantially perpendicular to said intended flow of said flowing medium.

24. An apparatus for determining at least one moment acting about a pre-determined axis on a vehicle provided with wheels, placed thereon in a flowing medium comprising
(a) means for measuring a force component causing said moment, said means having a pre-determined force introduction point for said force component said pre-determined force introduction point having a distance from said axis;
(b) means for determining said moment from said measured force component and said distance from said axis
(c) means for determining a displacement of said vehicle in dependence on the application of said flowing medium;
(d) means for evaluating the force measurement to correct for said displacement; and
(e) force introduction plates onto which said vehicle is placed with said wheels; wherein at least one of said force introduction plates is arranged movably in at least one direction.

25. The apparatus of claim 24 wherein at least one of said force introduction plates is kept fixed.

26. The apparatus of claim 24 wherein at least one of said force introduction plates is kept fixed and at least one of said force introduction plates is movable both in said direction of said intended flow of said flowing medium and perpendicular thereto.

27. The apparatus of claim 26 wherein one of said force introduction plates is kept fixed and at least one of said force introduction plates is movable both in said direction of said intended flow of said flowing medium and perpendicular thereto.

28. The apparatus of claim 27 further comprising means for applying vibrations onto said vehicle.

* * * * *